United States Patent [19]

Stoppani et al.

[11] 4,438,837
[45] Mar. 27, 1984

[54] CONVEYOR DRIVE GEAR BOX

[75] Inventors: Brian R. Stoppani, Doncaster; Nigel J. Box, Skellow; David D. Phillips, Worksop, all of England

[73] Assignee: Mining Supplies Limited, Balby, England

[21] Appl. No.: 148,164

[22] Filed: May 7, 1980

[30] Foreign Application Priority Data

May 10, 1979 [GB] United Kingdom ............... 7916281

[51] Int. Cl.³ .......................................... B65G 19/18
[52] U.S. Cl. .................................... 198/735; 198/834
[58] Field of Search ................. 198/834, 735, 856; 74/606 A; 73/118

[56] References Cited

U.S. PATENT DOCUMENTS

| 2,793,516 | 5/1957 | McDermott | 198/834 |
| 3,154,190 | 10/1964 | Gonski | 198/735 |
| 3,353,591 | 11/1967 | Zak | 74/606 A |
| 3,680,370 | 8/1972 | Muller-Berner | 73/118 |
| 3,686,935 | 8/1972 | May | 73/118 |
| 3,971,146 | 7/1976 | Hyler | 198/834 |

FOREIGN PATENT DOCUMENTS

| 2825813 | 1/1979 | Fed. Rep. of Germany | 74/606 |
| 711308 | 6/1934 | United Kingdom . | |
| 970427 | 9/1964 | United Kingdom . | |

Primary Examiner—Jeffrey V. Nase
Assistant Examiner—Dennis J. Williamson
Attorney, Agent, or Firm—King and Liles

[57] ABSTRACT

A gear box for a drive head of a conveyor comprises a casing 11 and a gear train contained within the casing 11 and including a plurality of shafts on which gear wheels are mounted, the shafts being rotatable about parallel axes and all the axes 16 being located in a common plane, with at least an output shaft having its axis of rotation off-set with respect to the common plane, whereby the at least one off-set axis is located above or below the common plane.

5 Claims, 5 Drawing Figures

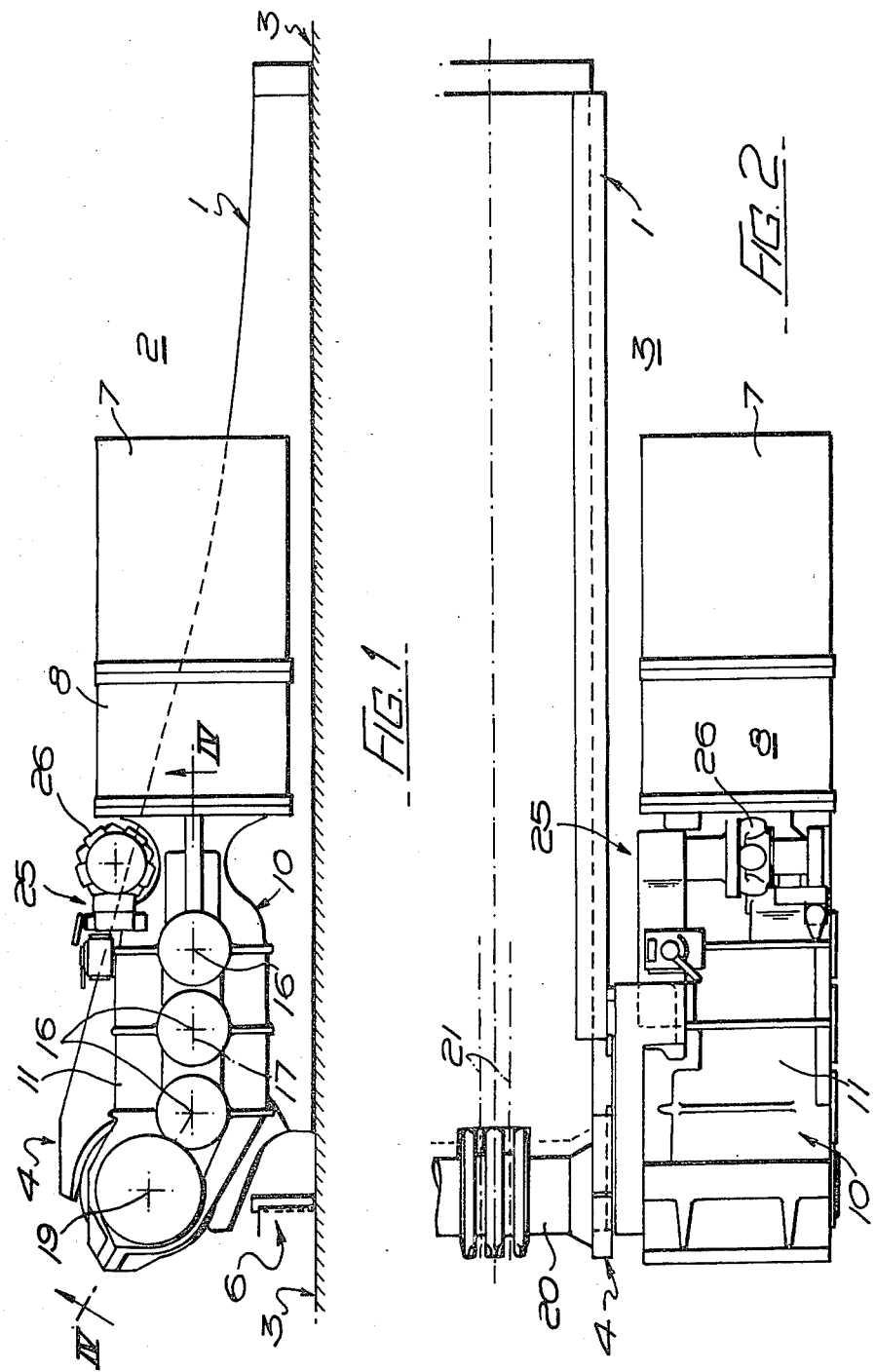

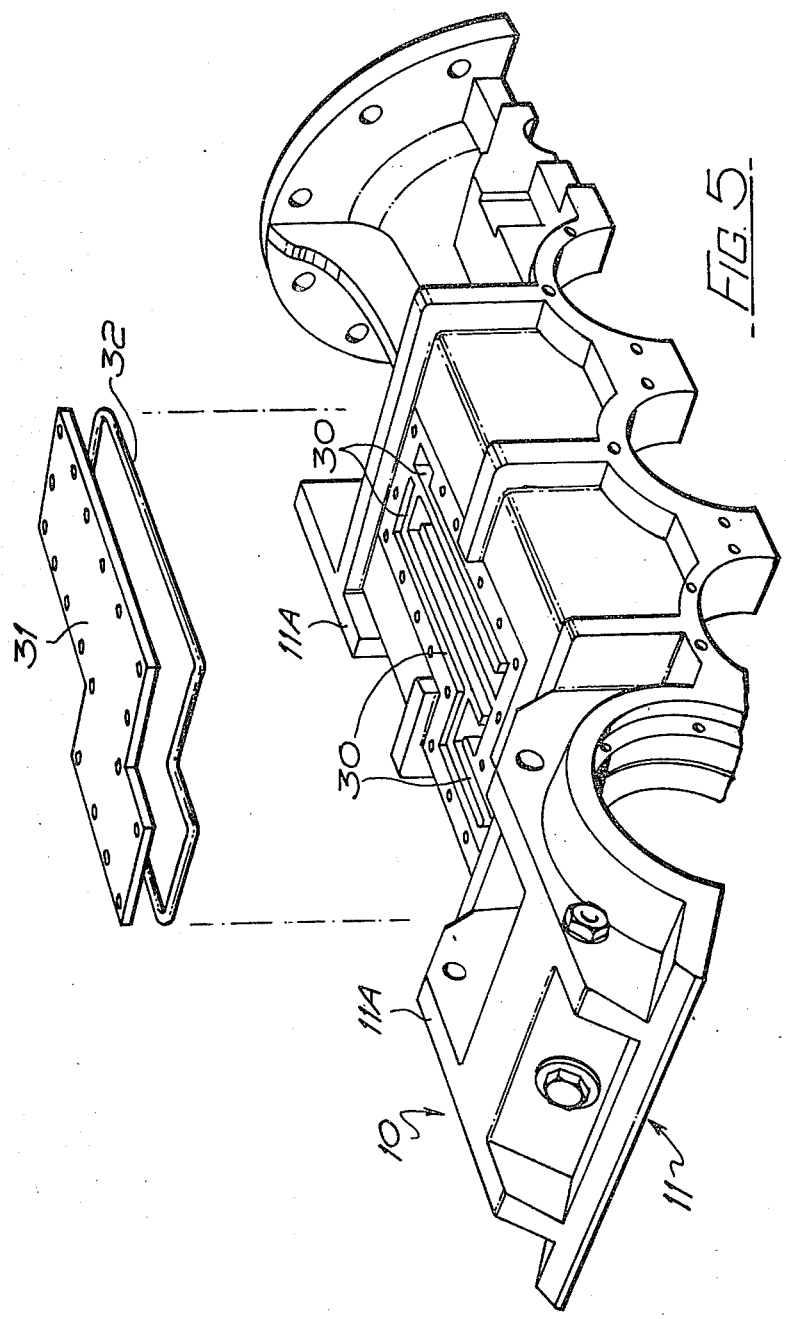

CONVEYOR DRIVE GEAR BOX

This invention relates to gear boxes for conveyor drive heads and to drive heads incorporating such gear boxes, in particular for driving scraper chain conveyors as are used extensively in coal mining operations, where a face conveyor extending along a mineral face loads on to an adjacent transfer conveyor (which may or may not be a scraper chain conveyor) at the elevated head of the face conveyor, although a similar drive head could additionally be located at the other, tail end of the conveyor.

Any drive head comprises basically an electric motor, a fluid coupling and a gear box, the latter having an output shaft located in the vicinity of a face conveyor drive barrel, sprocket teeth on the barrel engaging the one or more chains of the face conveyor. This drive head is usually located in line, and extending away from the drive barrel, while furthermore it is known to provide on the drive head a chain tensioning unit which is employed from time to time for chain tensioning/repair purposes to avoid employment of the electric motor of the drive head for this function. Apart from these requirements producing a relatively bulky drive head which is of disadvantage in the limited confines of a mine working, the casing of the drive head at the head end of the conveyor adjacent the transfer conveyor tends to overlie the latter and thereby presents some obstruction to the material, e.g. coal, being conveyed away from the face conveyor by the transfer conveyor. If a drive head is additionally provided at the tail end of the conveyor, the drive head often needs to be angled with respect to the conveyor which in the past has led to advancement problems at the tail end of the conveyor due to the drive unit penetrating the mine floor. Furthermore, the need to cool the oil of the gear box has led in the past to a requirement for bulk head fittings and a copper cooling coil in the gear box, which system introduces contamination hazards for the gear box oil.

According to a first aspect of the present invention there is provided a gear box for a conveyor drive head comprising a gear box casing and a gear train contained within the casing and including a plurality of shafts on which gear wheels are mounted, the shafts being rotatable about parallel axes and all the axes being located in a common plane, with at least an output shaft having its axis of rotation off-set with respect to the common plane, whereby the at least one offset axis is located above or below the common plane.

Thus the gear box casing may have an elevated nose or a depressed nose to accommodate the at least one off-set axis. The former arrangement gives the advantage that at the drive head of the conveyor, the output shaft is elevated above the adjacent transfer conveyor, thereby presenting little or no obstruction to the material, e.g. coal, being conveyed by the transfer conveyor. Furthermore, in circumstances where the tail end of the conveyor is also driven, the construction in accordance with the invention gives the advantage that the housing need no longer be angled with respect to the conveyor, while the latter arrangement gives the advantage that at the tail end of the conveyor the intermediate gears may be in an advantageous location for purposes of bearing lubrication. With either arrangement it is preferred that only the output shaft is off-set.

According to a second aspect of the invention, the gear box is provided with a double skin casing through which cooling water may be circulated to cool the oil of the gear box. This arrangement avoids the need for a copper cooling coil within the gear box.

According to a third aspect of the invention, the gear box further comprises a stall testing device including a rotatable element carried by one rotatable shaft of the gear box, an engagement member displaceable between engaging and non-engaging positions and in the former enabling stall testing operations to be effected.

The stall testing may, for instance, be on an associated fluid coupling, while the rotatable element is preferably mounted on the input shaft of the gear box. The provision in the gear box of such a stall testing device avoids the need to stake the conveyor chain to enable stall testing operations to be effected, as has been required with prior art proposals.

Preferably, the stall testing device takes the form of a detachable unit.

Finally, according to another feature of the present invention the gear box is provided with a chain tensioning arrangement, which arrangement includes a hydraulic motor, a gearing arrangement connected thereto, a dog clutch connected to the gearing arrangement and a control handle connected to the dog clutch to control the engagement/disengagement thereof, whereby in the former condition the electric motor drive becomes disengaged for operation of the hydraulic motor for conveyor chain tensioning purposes, and in the latter condition the electric motor drive is engaged and the hydraulic motor is disengaged.

The invention also includes a conveyor drive head incorporating any, some or all of the gear box features defined above.

The invention will now be described in greater detail, by way of example, with reference to the accompanying drawings in which:

FIG. 1 is a side elevation of the gearbox and conveyor drive head of the present invention located at a head end of a scraper chain conveyor;

FIG. 2 is a plan view of FIG. 1;

Figure 3:
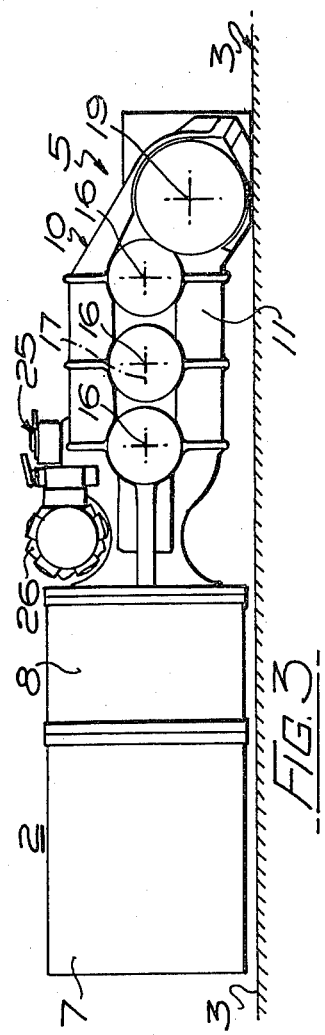
Figure 4:
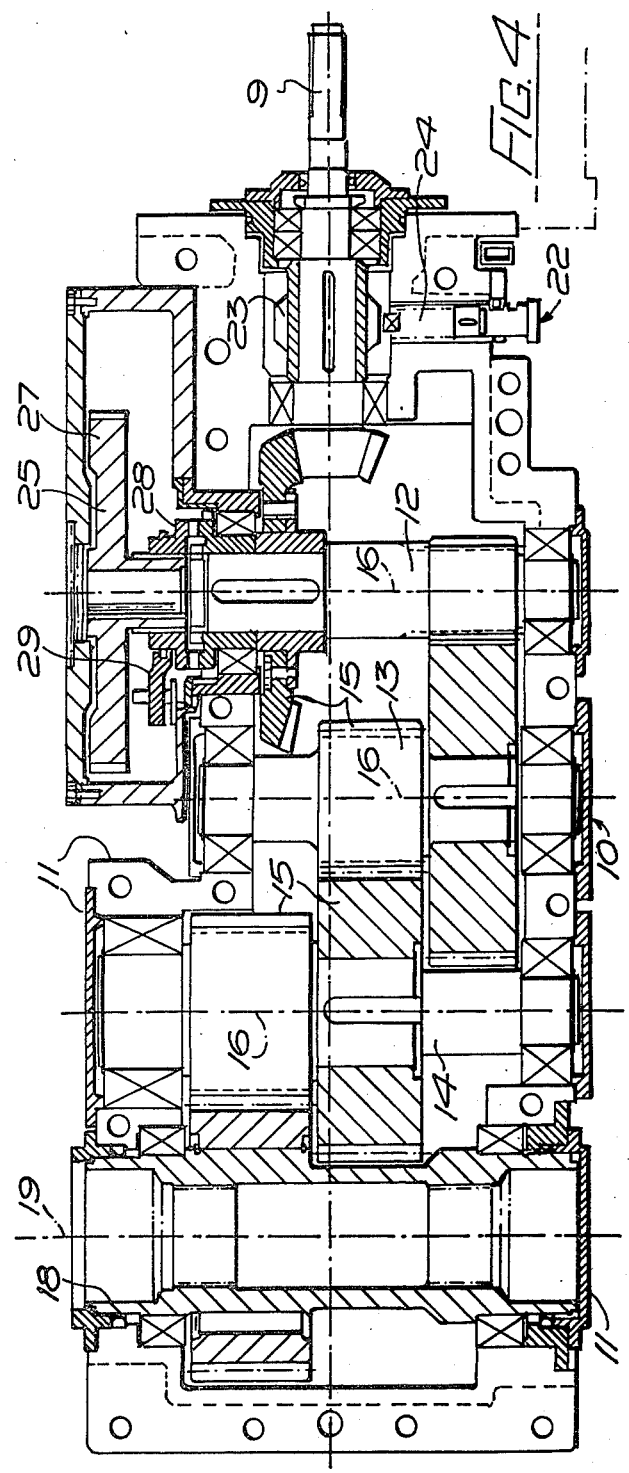

FIG. 3 corresponds to FIG. 1 but shows a gearbox and drive head of the present invention located at the tail end of the conveyor;

FIG. 4 is a section on the line IV—IV of FIG. 1; and

FIG. 5 shows further detail of FIG. 1.

In the drawings is illustrated part of a scraper chain conveyor 1 extending along a mineral face 2 and seating on a mine floor 3. At one end the conveyor 1 terminates at an elevated head end 4 and at the other end terminates in a tail end 5, the head end 4 being intended to discharge material e.g. coal, onto a transfer conveyor 6 extending transversely of the conveyor 1.

In the embodiment illustrated both the head end 4 and the tail end 5 of the conveyor are driven, the drives being effected by an electric motor 7, through a fluid coupling 8 to an input shaft 9 (FIG. 4) of the gearbox 10.

The gearbox 10 comprises a casing 11 and three speed reduction and power transmission shafts 12, 13, 14, each carrying gear wheels 15 and each rotatable about parallel axes 16 located in a common plane 17 indicated in chain dotted line in both FIGS. 1 and 3. An output shaft 18 geared to the shaft 14 has an axis of rotation 19 which is offset with respect to the common plane 17, as can be appreciated from FIGS. 1 and 3, the offsetting in FIG. 1 being located above the common plane 17, while the offsetting in FIG. 3 is located below the common plane 17. At the head end 4 of the conveyor 1, the output shaft 18 is connected to a rotatable sprocket drum 20 to drive twin centre strand chains 21 of the conveyor 1. A similar arrangement is provided at the tail end 5.

Also illustrated in FIG. 4 is a stall testing device 22 for testing the fluid coupling 8, the device comprising a rotatable element 23 carried by the input shaft 9 and a member 24 adapted to engage the element 23 for stall testing operations and displaceable between the disengaging position illustrated in FIG. 4, and an engaging position.

Finally, as illustrated in FIG. 4, the gearbox 10 is provided with a tensioning arrangement 25 for the chains 21, the arrangement including a hydraulic motor 26, a gearing arrangement 27 connected thereto and a dog clutch 28 connected to the gearing arrangement 27 and slidable by the action of a hand-controlled fork 29 between the engaging position illustrated in FIG. 4 and a disengaging position. In the former condition, the electric motor 7 becomes automatically inoperable.

FIG. 5 shows, in perspective, the top half 11A of the casing 11 of the gearbox 10. A double-skin construction is given to both the top casing half 11A (and the similar bottom casing half which is not illustrated) by forming conveying grooves 30 for cooling water during the casting of the top and bottom casing halves, the grooves 30 being externally closed by a closure plate 31 with an interposed gasket 32. Instead of the closure plate 31 being secured by bolts as indicated in FIG. 5, it could be secured by welding. Also, to assist in heat transfer, the inside of the top and bottom casing halves may be provided with fins opposite the grooves 30.

What I claim is:

1. A conveyor drive gear box, comprising:
   (a) a gear box casing, said gear box casing extending in a longitudinal direction in generally symmetrical relationship to a predetermined plane and having an offset nose above or below the predetermined plane projecting from a terminal end thereof;
   (b) an output shaft located in said casing nose; and
   (c) a gear train located within said casing for transmitting power to said output shaft, said gear train including a plurality of shafts with gear wheels mounted thereon, each of the shafts in said casing being rotatable about substantially parallel axes with all of the shafts in the gear train being located within the predetermined plane offset from the axis of the output shaft whereby the output shaft is located above or below said predetermined plane.

2. A gear box as claimed in claim 1, provided with a double skin casing to accept the circulation of cooling water.

3. A gear box as claimed in claim 1, comprising a rotatable input shaft, a stall testing device, a rotatable element of said stall testing device carried by said rotatable input shaft and an engagement member displaceable between engaging and nonengaging positions and in the former enabling stall testing operations to be effected.

4. A gear box as claimed in claim 3, wherein said stall testing device takes the form of a detachable unit.

5. A gear box as claimed in claim 1, comprising a chain tensioning arrangement, a hydraulic motor included in said chain tensioning arrangement, a gearing arrangement connected to said hydraulic motor, a dog clutch connected to said gearing arrangement and a control handle connected to said dog clutch to control the engagement/disengagement thereof.

* * * * *